US011643183B2

(12) United States Patent
Bhatia et al.

(10) Patent No.: US 11,643,183 B2
(45) Date of Patent: May 9, 2023

(54) SPAR ARRANGEMENT IN A WING TIP DEVICE

(71) Applicant: Airbus Operations Limited, Bristol (GB)

(72) Inventors: Sarabpal-Singh Bhatia, Bristol (GB); Samuel Phillips, Bristol (GB)

(73) Assignee: Airbus Operations Limited, Bristol (GB)

( * ) Notice: Subject to any disclaimer, the term of this patent is extended or adjusted under 35 U.S.C. 154(b) by 887 days.

(21) Appl. No.: 16/007,555

(22) Filed: Jun. 13, 2018

(65) Prior Publication Data

US 2018/0362143 A1    Dec. 20, 2018

(30) Foreign Application Priority Data

Jun. 15, 2017   (GB) ..................................... 1709523

(51) Int. Cl.
*B64C 3/18*     (2006.01)
*B64C 23/06*    (2006.01)
*B64F 5/10*     (2017.01)
*B64C 3/58*     (2006.01)

(52) U.S. Cl.
CPC ............. *B64C 3/185* (2013.01); *B64C 3/187* (2013.01); *B64C 3/58* (2013.01); *B64C 23/069* (2017.05); *B64F 5/10* (2017.01)

(58) Field of Classification Search
CPC ....... B64C 23/069; B64C 3/185; B64C 3/187; B64C 3/58; B64C 3/18; B64C 23/065
See application file for complete search history.

(56) References Cited

U.S. PATENT DOCUMENTS

| 1,710,673 | A |   | 4/1929  | Bonney    |              |
|-----------|---|---|---------|-----------|--------------|
| 1,992,560 | A | * | 2/1935  | Welman    | B64C 3/00    |
|           |   |   |         |           | 244/123.8    |
| 2,167,601 | A | * | 7/1939  | Rose      | B64C 9/22    |
|           |   |   |         |           | 244/211      |
| 2,182,366 | A | * | 12/1939 | Van Vliet | B64C 3/52    |
|           |   |   |         |           | 244/38       |
| 2,198,496 | A | * | 4/1940  | Gwinn, Jr.| B64C 3/00    |
|           |   |   |         |           | 244/87       |
| 2,311,683 | A | * | 2/1943  | Naugle    | B64C 3/22    |
|           |   |   |         |           | 244/123.7    |
| 3,018,985 | A |   | 1/1962  | Voigt     |              |

(Continued)

FOREIGN PATENT DOCUMENTS

DE    10 2010 014 633    10/2011
GB            193880      2/1923

(Continued)

OTHER PUBLICATIONS

Combined Search and Examination Report for GB1709523.3, dated Nov. 24, 2017, 7 pages.

(Continued)

*Primary Examiner* — Philip J Bonzell
(74) *Attorney, Agent, or Firm* — Nixon & Vanderhye P.C.

(57) ABSTRACT

An aircraft (1) having a wing (3) and a wing tip device (4) at the tip of the wing (3), the wing tip device (4) having front and rear spars (14, 13), wherein the wing tip device (4) has a cross-brace spar (18) that links the front and rear spars and is oriented such that it is oblique to the front and rear spars (14, 13).

24 Claims, 8 Drawing Sheets

(56) References Cited

U.S. PATENT DOCUMENTS

| | | | |
|---|---|---|---|
| 9,056,671 B2* | 6/2015 | Heller | B64C 23/069 |
| 9,415,858 B2* | 8/2016 | Dan-Jumbo | B32B 27/38 |
| 9,555,874 B2* | 1/2017 | Heller | B64C 23/069 |
| 9,701,393 B2* | 7/2017 | Honorato Ruiz | B29C 70/42 |
| 9,919,791 B2* | 3/2018 | Autry | B29C 70/00 |
| 10,155,581 B2* | 12/2018 | Dan-Jumbo | B64C 3/185 |
| 10,479,474 B2* | 11/2019 | Shemkunas | B64C 3/26 |
| 2005/0133672 A1* | 6/2005 | Irving | B64C 23/072 244/201 |
| 2012/0112005 A1 | 5/2012 | Chaussee et al. | |
| 2013/0277504 A1* | 10/2013 | Heller | B64C 3/58 244/35 R |
| 2014/0048652 A1* | 2/2014 | Honorato Ruiz | B29C 70/42 244/123.1 |
| 2015/0321746 A1* | 11/2015 | Heller | B64C 3/58 244/199.4 |
| 2016/0046361 A1* | 2/2016 | Dan-Jumbo | B64C 3/182 244/87 |
| 2016/0144969 A1* | 5/2016 | Rawdon | B64C 23/069 244/13 |
| 2016/0297512 A1* | 10/2016 | Dan-Jumbo | B64C 3/20 |
| 2016/0304187 A1* | 10/2016 | Autry | B64C 3/18 |
| 2016/0325822 A1* | 11/2016 | Mosqueira | B64C 5/02 |
| 2018/0015996 A1* | 1/2018 | Shemkunas | B64C 3/18 |

FOREIGN PATENT DOCUMENTS

| | | | | |
|---|---|---|---|---|
| GB | 215048 | | 5/1924 | |
| GB | 352287 | | 7/1931 | |
| GB | 382176 | | 10/1932 | |
| GB | 387904 A | * | 2/1933 | B64C 3/185 |
| GB | 410405 | | 5/1934 | |
| GB | 447459 | | 5/1936 | |

OTHER PUBLICATIONS

European Search Report cited in EP 18177110.6 dated Oct. 12, 2018, 8 pages.

* cited by examiner

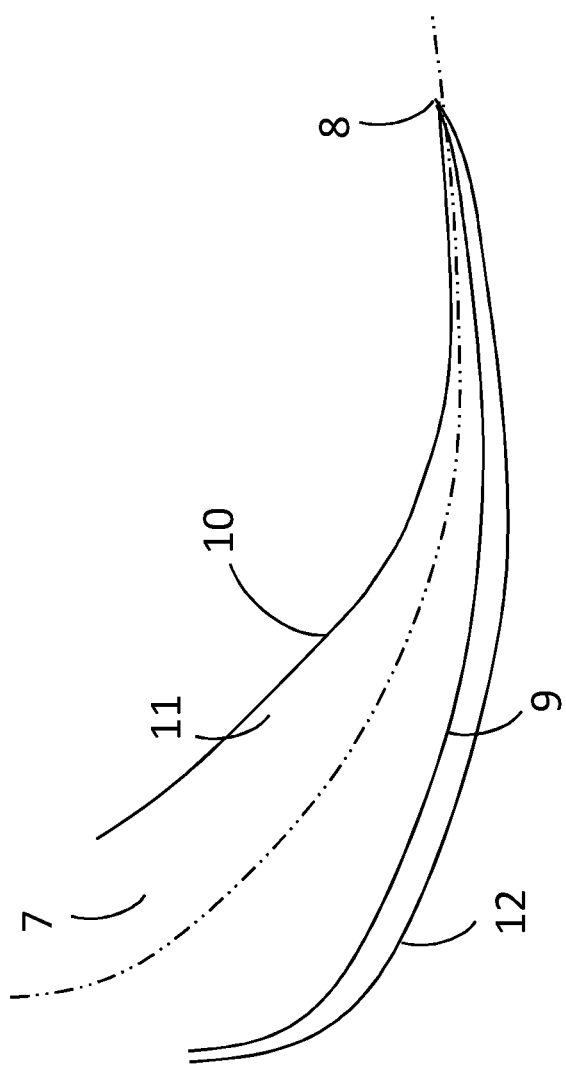

SPAR ARRANGEMENT IN A WING TIP DEVICE

RELATED APPLICATION

This application claims priority to United Kingdom Patent Application (GB) 1709523.3 filed Jun. 15, 2017, the entirety of which is incorporated by reference.

BACKGROUND OF THE INVENTION

The present invention relates to an aircraft having a wing and a wing tip device. The present invention also relates to a wing assembly and to a wing tip device. The present invention also relates to a method of manufacture of an aircraft, wing assembly and wing tip device.

Wing tip devices, for example winglets, are used to improve the efficiency of fixed wing aircraft, predominantly by reducing lift induced drag. Although this may increase the profile drag, the overall lift to drag ratio is increased. This increases fuel efficiency, which is particularly important with passenger aircraft.

Conventional winglets comprise front and rear spars that are attached to each other by ribs distributed along the span-wise direction of the winglet.

However, as the size and sweep of wing tip devices increase, the loading on the wing tip devices increases. With a conventional wing tip device design, such as the above conventional winglet design, this can present a number of design obstacles.

The present invention seeks to address or mitigate at least some of the above mentioned problems. Alternatively, or additionally, the present invention seeks to provide an improved aircraft having a wing tip device. Alternatively, or additionally, the present invention seeks to provide an improved wing assembly comprising a wing and a wing tip device. Alternatively, or additionally, the present invention seeks to provide an improved wing tip device for an aircraft. Alternatively, or additionally, the present invention seeks to provide an improved method of manufacture of a wing tip device for an aircraft. Alternatively, or additionally, the present invention seeks to provide an improved method of manufacture of a wing assembly comprising a wing and a wing tip device. Alternatively, or additionally, the present invention seeks to provide an improved method of manufacture of an aircraft having a wing tip device.

SUMMARY OF THE INVENTION

According to a first aspect of the invention there is provided an aircraft comprising a wing and a wing tip device at the tip of the wing, the wing tip device having front and rear spars, wherein the wing tip device comprises a cross-brace spar that links the front and rear spars. In embodiments of the invention the cross-brace spar is oriented such that it is oblique to the front and rear spars.

This is advantageous in that the cross-brace spar may transmit aerodynamic loads between the front and rear spars, thereby reducing the load on at least one of the spars. Furthermore, the cross-brace spar may help to provide a more balanced load path into the wing (i.e. into a wing box of the wing). The cross-brace spar may allow the wing tip device to more effectively resist the external aerodynamic loads, for example during gust and manoeuvre.

The cross-brace spar may allow for a reduction in the number of ribs that would otherwise be required in order to resist the required aerodynamic loads. In this respect, the cross-brace spar may advantageously react the brazier load that would usually be carried by ribs. Similarly, the cross-brace may allow for the reduction in the number of other components that may otherwise be required in order to resist the aerodynamic loads, for example stringers and rib posts. The cross-brace spar may allow for a reduction in the thickness of the wing assembly, and of the number of bolts required, to transfer load at the connection of the wing tip device to the wing.

In view of the above, the cross-brace spar may facilitate a reduction in weight of the wing tip device and therefore of the aircraft, thereby providing performance advantages. Due to the reduction in parts required, the cross-brace spar may provide a reduction in manufacturing time and cost.

In embodiments of the invention the cross-brace spar links a first location on the rear spar to a second location on the front spar.

In embodiments of the invention the cross-brace spar links the first location on the rear spar to the second location on the front spar such that it transmits aerodynamic loads between the front and rear spars. In embodiments of the invention the cross-brace spar is oriented at said oblique angle such that it transmits aerodynamic loads between the front and rear spars. It will be appreciated that references to the transmittal of aerodynamic loads is in relation to when the aircraft is in use, i.e. in flight.

In embodiments of the invention the cross-brace spar is configured to provide a primary load path between the front and rear spars. The aerodynamic loads may be external forces and moments on the wing tip device, namely bending moment, shear force and torque.

In embodiments of the invention the first and second locations are spaced in the span wise direction. In embodiments of the invention the cross-brace spar is directly attached to the rear spar at the first location and is directly attached to the front spar at the second location. This is advantageous in that it may provide a relatively continuous load path.

It will be appreciated that the term 'oblique' refers to any inclined orientation that is not perpendicular (or parallel).

In embodiments of the invention the front and rear spars are configured to transmit aerodynamic load into the wing. Optionally the front and rear spars are attached to a root rib of the wing tip device. Optionally the front and rear spars are attached to front and rear spars of the wing (for example via a root rib of the wing tip device). Optionally the front and rear spars of the wing tip device are attached to a wing box of the wing.

In embodiments of the invention the cross-brace spar is oriented such that:

a plane that passes through the first and second locations and is parallel to the thickness direction of the wing tip device at the first location is oriented at an oblique angle to a plane that passes through the first location and a location on the rear spar that is at a corresponding span wise position to the second location and is parallel to the thickness direction of the wing tip device at the first location; and a plane that passes through the first and second locations and is parallel to the thickness direction of the wing tip device at the second location is oriented at an oblique angle to a plane that passes through the second location and a location on the front spar that is at a corresponding span-wise position to the first location and is parallel to the thickness direction of the wing tip device at the second location.

In embodiments of the invention the cross-brace spar is oriented such that:

a straight line that passes through the first and second locations is oriented at an oblique angle to a straight line that passes through the first location and a location on the rear spar that is at a corresponding span wise position to the second location, when the wing tip device is viewed looking along an axis that is parallel to the thickness direction of the wing tip device at the first location; and a straight line that passes through the first and second locations is oriented at an oblique angle to a straight line that passes through the second location and a location on the front spar that is at a corresponding span-wise position to the first location, when the wing tip device is viewed looking along an axis that is parallel to the thickness direction of the wing tip device at the second location.

In embodiments of the invention the cross-brace spar extends along a longitudinal direction from a rear end, attached to the rear spar at the first location, to a front end attached to the front spar at the second location. Optionally the rear spar extends along a longitudinal direction from the first location to a location on the rear spar that is at a corresponding span wise position to the second location and the front spar extends along a longitudinal direction from the second location to a location on the front spar that is at a corresponding span wise position to the first location;

wherein at the first location the local longitudinal direction of the cross-brace spar is oblique to the local longitudinal direction of the rear spar when the wing tip device is viewed looking along an axis that is parallel to the thickness direction of the wing tip device at the first location; and at the second location the local longitudinal direction of the cross-brace spar is oblique to the local longitudinal direction of the front spar when the wing tip device is viewed looking along an axis that is parallel to the thickness direction of the wing tip device at the second location.

It will be appreciated that reference to a 'local' longitudinal direction refer to the direction of a tangent to the longitudinal direction at that location.

In embodiments of the invention the oblique angles referred to above are the respective internal angles defined by the respective notional planes/lines, i.e. between adjacent and opposing faces of the respective planes. In embodiments of the invention these internal angles are acute angles, i.e. less than 90°.

Optionally the first location is an inboard location and the second location is an outboard location. In this respect, optionally the cross-brace spar links an inboard location on the rear spar to an outboard location on the front spar. Optionally the cross-brace spar is directly attached to the rear spar at the inboard location and is directly attached to the front spar at the outboard location.

In embodiments of the invention the longitudinal direction, of the cross-brace spar, extends outboard in the span wise direction as it extends forwards in the chord wise direction.

Optionally the cross-brace spar is curved. In this regard, the cross-brace spar may curve as it extends from its rear end to its front end. Accordingly the longitudinal direction of the cross-brace spar may be curved.

Optionally the wing tip device comprises a rib that links the front and rear spars and the cross-brace spar is linked to the rib.

In embodiments of the invention the cross-brace spar is linked to the rib such that it transmits aerodynamic loads between the front and rear spars and the rib.

The cross-brace spar may be directly attached to the rib. In this respect, the cross-brace spar may be directly attached to the rib part way along the length of the rib or to an end of the rib.

Alternatively, or additionally, the cross-brace spar may not be directly attached to the rib, but may be linked to the rib by its attachment to the front and/or rear spars.

Optionally the cross-brace spar is oriented such that it is oblique to the rib.

Optionally the wing tip device comprises an inboard rib and an outboard rib that each link the front and rear spars and wherein the cross-brace spar is linked to the inboard and outboard ribs.

In embodiments of the invention the cross-brace spar is linked to the inboard and outboard ribs such that the cross-brace spar transmits aerodynamic loads between the inboard and outboard ribs and the front and rear spars.

Preferably a rear end of the inboard rib is directly attached to the rear spar at the first location and a front end of the outboard rib is directly attached to the front spar at the second location.

Preferably the cross-brace spar is directly attached to the inboard rib and/or outboard rib. Preferably the cross-brace spar is directly attached to a rear end of the inboard rib at the inboard location and to a front end of the outboard rib at the outboard location.

Alternatively, or additionally, in respect of either or both of the inboard and outboard ribs, the cross-brace spar may not be directly attached to the rib but may be linked to the rib by its attachment to the front and/or rear spars.

Optionally the inboard and outboard ribs and the front and rear spars together form a structural box and the cross-brace spar extends diagonally across the structural box.

Preferably the cross-brace spar extends diagonally across the box from a corner of the box to a diagonally opposite corner of the box. Alternatively, the cross-brace spar may extend diagonally across the box from and/or to a non-corner position of the box.

Optionally the cross-brace spar extends from a location at which the inboard rib is attached to the rear spar to a location at which the outboard rib is attached to the front spar.

The cross-brace spar may be directly attached to the inboard rib, for example at the inboard location, and the cross-brace spar may be directly attached to the outboard rib, for example at the outboard location.

Optionally the wing tip device comprises an intermediate rib, positioned between the inboard and outboard ribs, and wherein the cross-brace spar is linked to the intermediate rib. In embodiments of the invention the cross-brace spar is linked to the intermediate rib such that it transmits aerodynamic loads between the intermediate rib, the inboard and outboard ribs and the front and rear spars.

Preferably the cross-brace spar is directly attached to the intermediate rib.

Alternatively, the cross-brace spar may not be directly attached to the intermediate rib but may be linked to the intermediate rib by its direct attachment to one or more of the front spar, rear spar, inboard rib and outboard rib.

Optionally the cross-brace spar extends through the intermediate rib. Optionally the cross-brace spar is directly attached to the intermediate rib at a position intermediate the front and rear ends of the cross-brace spar.

Optionally the cross-brace spar is oriented such that it is oblique to the, or each, rib.

Optionally the, or each, rib is substantially perpendicular to at least one of the front and rear spars. Optionally the, or each, rib is substantially perpendicular to one of the front and rear spars and is oriented at an oblique angle to the other of the front and rear spars.

Preferably the, or each, rib is substantially perpendicular to the rear spar and is oriented at an oblique angle to the forward spar. Alternatively, optionally the, or each rib is substantially perpendicular to the front spar and is oriented at an oblique angle to the rear spar.

Optionally the cross-brace spar is a single continuous spar.

Optionally the cross-brace spar is substantially continuous from its rear end to its front end.

Optionally the wing tip device is swept back.

Optionally the wing tip device has a high sweep angle. Optionally the wing tip device has a sweep angle in the range 30° to 60°.

The cross-brace spar is particularly advantageous when the wing tip device is highly swept back because this produces a high external yaw component of loading during high manoeuvre and gust conditions. This high degree of loading would otherwise be taken by the rear spar. Therefore the cross-brace spar decreases the loading on the rear spar.

Optionally the wing tip device extends upwardly as it extends outboard in the span wise direction.

Optionally the wing tip device is curved along its length in the span wise direction.

Optionally the wing tip device is twisted about a span wise axis of the wing tip device.

Optionally the wing tip device twists anti-clockwise when looking from the root to the tip of the wing tip device. In this regard, optionally the winglet twist is washed out.

In embodiments of the invention the wing tip device is configured to reduce induced drag on the wing.

In embodiments of the invention the wing tip device is fixed relative to the wing.

Optionally the wing tip device comprises a winglet. Alternatively, or additionally, the wing tip device may comprise a wing tip fence, a raked wing tip or a wing tip extension, for example.

Optionally the wing and the wing tip device form a wing assembly and the wing tip device is located within the outboard most 40% of the span wise extent of the wing assembly, preferably within the outboard most 30% of the span wise extent of the wing assembly, more preferably within the outboard most 20% of the span wise extent of the wing assembly, even more preferably within the outboard most 10% of the span wise extent of the wing assembly.

Optionally the wing is swept back. Optionally the wing has a high sweep angle.

In embodiments of the invention the aircraft comprises a pair of said wings and wing tip devices. The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably under-wing, engines.

According to a second aspect of the invention there is provided a wing assembly comprising a wing and a wing tip device at the tip of the wing, the wing tip device having front and rear spars, wherein the wing tip device comprises a cross-brace spar that links the front and rear spars and is oriented such that it is oblique to the front and rear spars.

Optionally the cross-brace spar links an inboard location on the rear spar to an outboard location on the front spar.

In embodiments of the invention the wing tip device of the wing assembly of the second aspect of the invention is for use as the wing tip device in the first aspect of the invention. The wing tip device of the wing assembly of the second aspect of the invention may have any, or all, of the features of the wing tip device in the first aspect of the invention.

According to a third aspect of the invention there is provided a wing tip device for use with a wing of an aircraft, the wing tip device having front and rear spars, wherein the wing tip device comprises a cross-brace spar that links the front and rear spars and is oriented such that it is oblique to the front and rear spars.

Optionally the cross-brace spar links an inboard location on the rear spar to an outboard location on the front spar.

In embodiments of the invention the wing tip device of the third aspect of the invention is for use as the wing tip device in the first aspect of the invention. The wing tip device of the third aspect of the invention may have any, or all, of the features of the wing tip device in the first aspect of the invention.

According to a fourth aspect of the invention there is provided method of manufacture of a wing tip device for use with a wing of an aircraft, the method comprising linking a front and rear spar of the wing tip device with a cross-brace spar that is oblique to the front and rear spars.

Optionally the cross-brace spar links an inboard location on the rear spar to an outboard location on the front spar.

According to a fifth aspect of the invention there is provided a method of manufacture of a wing assembly comprising a wing and a wing tip device at the tip of the wing, wherein the method comprises manufacturing a wing tip device according to the fourth aspect of the invention and attaching the wing tip device to a tip of a wing for an aircraft.

The front and rear spars of the wing tip device may be linked by the cross-brace spar before or after the wing tip device is attached to the tip of the wing. However, preferably the front and rear spars of the wing tip device are linked by the cross-brace spar before the wing tip device is attached to the tip of the wing.

According to a sixth aspect of the invention there is provided a method of manufacture of an aircraft comprising a wing and a wing tip device at the tip of the wing, wherein the method comprises manufacturing a wing assembly according to the fifth aspect of the invention and attaching the wing assembly to a fuselage of an aircraft.

The front and rear spars of the wing tip device may be linked by the cross-brace spar before or after the wing tip device is attached to the tip of the wing and before or after the wing is attached to the fuselage of the aircraft. However, preferably the front and rear spars of the wing tip device are linked by the cross-brace spar before the wing tip device is attached to the tip of the wing and before the wing is attached to the fuselage of the aircraft.

In embodiments of the invention the method comprises attaching the cross-brace spar to the inboard location on the rear spar and to the outboard location on the front spar.

According to a seventh aspect of the invention there is provided an aircraft comprising a wing and a wing tip device at the tip of the wing, the wing tip device having front and rear spars, and an inboard rib and an outboard rib that each link the front and rear spars, the inboard and outboard ribs and the front and rear spars together forming a structural box, wherein the wing tip device further comprises a structural brace support that links an inboard location on the rear spar to an outboard location on the front spar and extends diagonally across the structural box.

According to an eighth aspect of the invention there is provided a wing assembly comprising a wing and a wing tip device at the tip of the wing, the wing tip device having front and rear spars, and an inboard rib and an outboard rib that each link the front and rear spars, the inboard and outboard ribs and the front and rear spars together forming a structural box, wherein the wing tip device further comprises a structural brace support that links an inboard location on the rear spar to an outboard location on the front spar and extends diagonally across the structural box.

According to a ninth aspect of the invention there is provided a wing tip device for use with a wing of an aircraft, the wing tip device having front and rear spars, and an inboard rib and an outboard rib that each link the front and rear spars, the inboard and outboard ribs and the front and rear spars together forming a structural box, wherein the wing tip device further comprises a structural brace support that links an inboard location on the rear spar to an outboard location on the front spar and extends diagonally across the structural box.

According to a tenth aspect of the invention there is provided a method of manufacture of a wing tip device for use with a wing of an aircraft, the method comprising linking front and rear spars of the wing tip device with inboard and outboard ribs to form a structural box, wherein the method further comprises linking an inboard location on the rear spar to an outboard location on the front spar with a structural brace support that extends diagonally across the structural box.

According to an eleventh aspect of the invention there is provided a method of manufacture of a wing assembly comprising a wing and a wing tip device at the tip of the wing, wherein the method comprises manufacturing a wing tip device according to the tenth aspect of the invention and attaching the wing tip device to a tip of a wing for an aircraft.

According to a twelfth aspect of the invention there is provided a method of manufacture of an aircraft comprising a wing and a wing tip device at the tip of the wing, wherein the method comprises manufacturing a wing assembly according to the eleventh aspect of the invention and attaching the wing assembly to a fuselage of an aircraft.

The structural brace support may be a spar, preferably a cross-brace spar, for example.

In embodiments of the invention the structural brace support links the inboard location on the rear spar to the outboard location on the front spar such that it transmits aerodynamic loads between the front and rear spars and the inboard and outboard ribs.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIG. 5 is a perspective view (from above and looking inboard) of the wing tip device shown in FIGS. 3 and 4;

DETAILED DESCRIPTION

Figure 1:
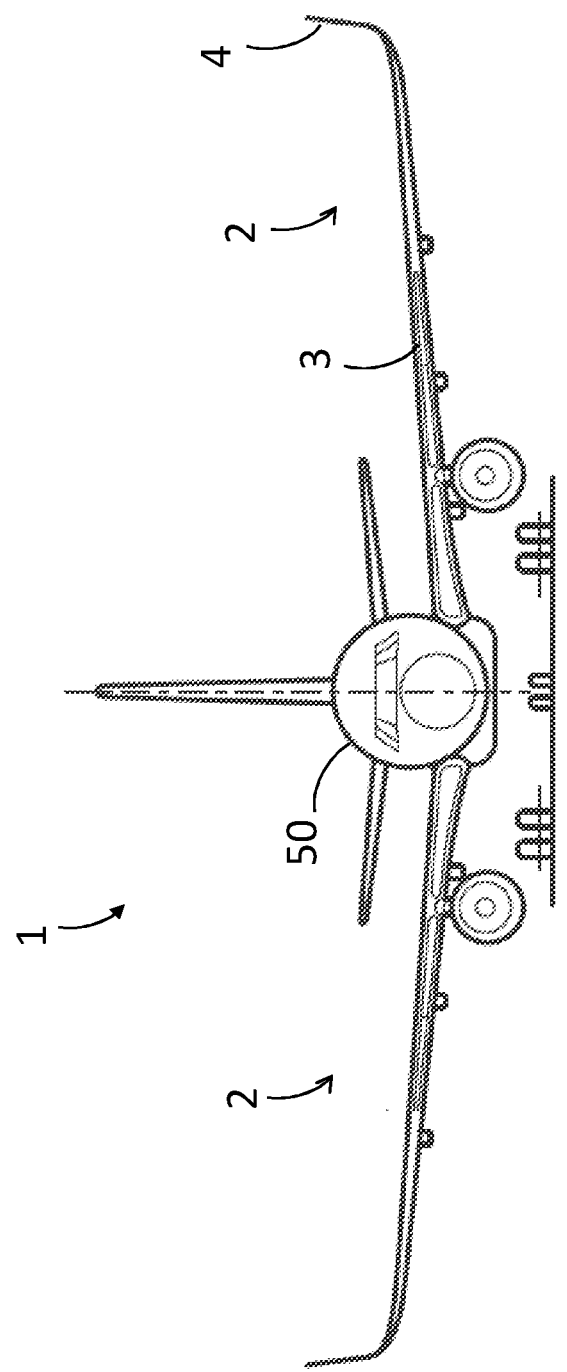
FIG. 1 is a front view of an aircraft according to an embodiment of the invention.

FIG. 1 illustrates an aircraft 1 according to an embodiment of the invention. The aircraft 1 is a commercial jet aircraft that comprises a pair of wing assemblies 2 attached on opposite sides of a fuselage 50. The aircraft 1 is a passenger aircraft comprising a passenger cabin comprising a plurality of rows and columns of seat units for accommodating a multiplicity of passengers, in this case more than 50 passengers. The aircraft 1 is a powered aircraft and comprises a pair of engines, mounted under the wing assemblies 2, for propelling the aircraft 1.

Each wing assembly 2 comprises a wing 3 and a wing tip device in the form of a winglet 4 attached to the outboard tip of the wing 3. The winglet 4 is fixed relative to the wing 3.

Figure 2:
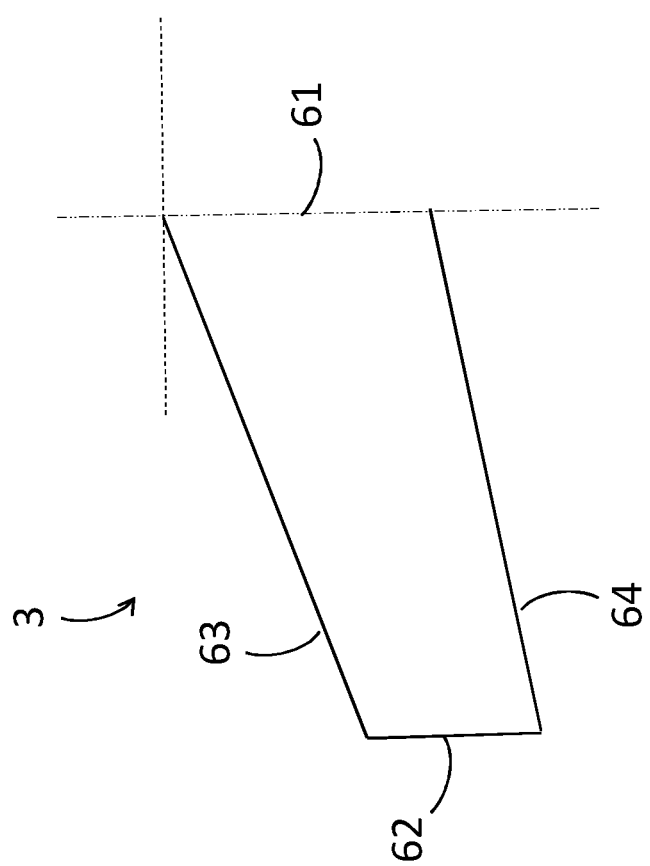
FIG. 2 is a schematic plan view of a port wing 3 of the aircraft of FIG. 1 (where the wing tip device is omitted for illustrative purposes)
Figure 4:
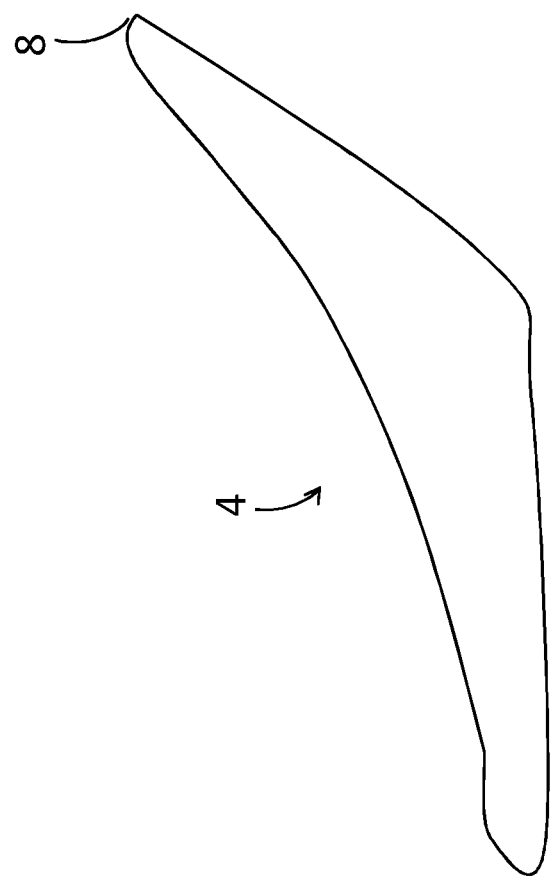
FIG. 4 is a side perspective view (looking inboard and rearward) of the wing tip device shown in FIG. 3.
Figure 3:
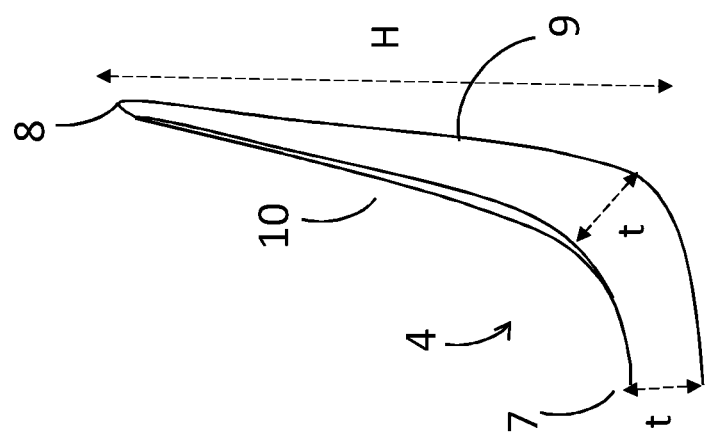
FIG. 3 is a front perspective view of a wing tip device of the port wing assembly of the aircraft shown in FIG. 1.

Referring to FIG. 2, the wing 3 extends outboard in a span wise direction, from an inboard end 61, attached to the fuselage 50, to a tip 62. The wing 3 also extends in a chord wise direction from a trailing edge 64 to a leading edge 63. The wing 3 is swept back. It will be appreciated that FIG. 2 is a schematic view and is not to scale.

Referring to FIGS. 3 to 7, the winglet 4 extends outboard in a span wise direction (S), from an inboard end 7, attached to the outboard tip 62 of the wing 3, to a tip 8. The winglet 4 also extends in a chord wise direction (C) from a trailing edge 10 to a leading edge 9. The winglet 4 comprises upper and lower skins 11, 12 (see FIG. 5). The upper and lower skins 11, 12 provide the aerodynamic surfaces that are exposed to the air flow during flight. The winglet 4 extends in a thickness direction (t) (see FIG. 3) between the upper and lower wing skins 11, 12. It will be appreciated that references to the thickness direction (t) refer to the local thickness direction.

The winglet 4 is slightly cambered.

The winglet 4 curves upwardly as it extends outboard in the span wise direction S. The curvature of local dihedral increases from a low angle, or an angle of approximately zero, at or near the inboard end 7 of the winglet 4 and increases in the outboard direction. The outboard end of the winglet 4 is almost vertical but is inclined at a small angle with respect to the vertical plane.

The winglet 4 is swept back. In the currently described embodiment the wing tip device is swept back by a sweep angle (X) of 35° (see FIG. 6).

The winglet 4 is twisted about a span wise axis of the winglet 4. The winglet twist is washed out. In this regard, the winglet twists anti-clockwise when looking from the inboard end 7 to the outboard tip 8 of the wing tip device 4.

The leading and trailing edges 9, 10 of the winglet 4 are continuations of the leading and trailing edges of wing 3. Furthermore, the upper and lower surfaces of the winglet 4 are continuations of the upper and lower surfaces of the wing 3. Thus there is a smooth transition, from the wing 3 to the winglet 4. It will be appreciated that there may be a smooth transition, even where there are changes in sweep or twist at the junction between the wing 3 and winglet 4. However, there are preferably no discontinuities at the junction between the wing 3 and winglet 4.

The winglet 4 is configured to reduce the induced drag on the wing assembly 2 (and on the aircraft 1 as a whole), leading to improve fuel efficiency and reduced carbon emissions.

The winglet 4 comprises rear and front spars 13, 14 (see FIGS. 6 and 7) that are spaced in the chord wise direction C of the winglet 4. It will be appreciated that in relation to the rear and front spars 13, 14, the terms 'rear' and 'front' are relative to each other, i.e. the front spar is forward of the rear spar, in the chord wise direction of the winglet 4 (and vice versa). In the described embodiment, the rear and front spars 13, 14 are the rear-most and front-most spars of the winglet 4 respectively. Alternatively, there may be additional spars in front of the front spar 14 and behind the rear spar 13. However, preferably the rear and front spars 13, 14 are the rear-most and front-most spars of the winglet 4 respectively.

The rear and front spars 13, 14 are located proximal the trailing and leading edges 10, 9 of the winglet 4 respectively. Each spar 13, 14 extend outboard, in the span wise direction, from the inboard end 7 of the winglet 4. Each of the rear and front spars 13, 14 has a generally C-shaped cross-sectional shape, where the C-shape faces inwardly (i.e. towards the centre-line of the winglet 4). However it will be appreciated that the rear and front spars 13, 14 may have other cross-sectional shapes, including I-shaped, H-shaped, square or rectangular cross-sectional shapes, for example.

The rear and front spars 13, 14 are located internally of the upper and lower skins 11, 12 and are attached (e.g. by bonding or fasteners) to the upper and lower wing skins 11, 12 to increase the rigidity of the wing skins 11, 12.

Each of the rear and front spars 13, 14 extends from an inboard end 13A, 14A, to an outboard end 13B, 14B along a longitudinal direction 13C, 14C. Each of the rear and front spars 13, 14 twist anticlockwise slightly (when looking from their inboard end to the outboard end) and curve upwardly, as they extend outboard, in order to match the shape of twist and upward curvature of the winglet 4. Since the wing tip device 4 is swept back, each of the rear and front spars 13, 14 is swept back accordingly. The front spar 14 has a slightly higher sweep angle than the rear spar 13.

The inboard ends 13A, 14A of the rear and front spars 13, 14 are respectively attached to a winglet root rib 51 (shown schematically in FIGS. 6 and 7, for illustrative purposes), which is attached to outboard ends of rear and front spars 40, 41 of the wing 3 (shown schematically in FIGS. 6 and 7), which form part of the wing box of the wing 3. Accordingly the rear and front spars 13, 14 of the winglet 4 are attached to the rear and front spars 40, 41 of the wing 3, via the winglet root rib 51. In this respect, the rear and front spars 13, 14 of the winglet 4 are attached to the wing box of the wing 3. The rear and front spars 13, 14 are configured to transmit aerodynamic loads into the wing 3, specifically into the wing box of the wing 3.

The winglet 4 also comprises an inboard rib 15, an outboard rib 17 and an intermediate rib 16 positioned between the inboard rib 15 and the outboard rib 17, in the span wise direction. It will be appreciated that the terms 'inboard' and 'outboard' are relative to each other, i.e. the inboard rib 15 is inboard, in the span wise direction (S), of the outboard rib 17 (and vice versa). There may be additional ribs inboard of the inboard rib 15 and outboard of the outboard rib 17, for example. In this respect, in the currently described embodiment there are a plurality of ribs (not shown) that are outboard of the outboard rib 17 and the winglet root rib 51 is inboard of the inboard rib 15. The inboard rib 15 is located adjacent to the winglet root rib 51.

The ribs 15, 16, 17 are located internally of the upper and lower wing skins 11, 12 and are attached (e.g. by bonding or fasteners) to the upper and lower wing skins 11, 12 to increase the rigidity of the wing skins 11, 12.

Each rib 15, 16, 17 is substantially perpendicular to the rear spar 13 (at the location of attachment of the rib to the rear spar 13) and is oriented at an oblique angle to the front spar 14.

Each rib 15, 16, 17 structurally links the rear and front spars 13, 14 together. In this regard, for each rib 15, 16, 17, rear and front ends of the rib are directly attached to the rear and front spars 13, 14 respectively.

In this respect, a rear end of the inboard rib 15 is directly attached to the rear spar 13 at the inboard location L1 and a front end of the outboard rib 17 is directly attached to the front spar 14 at the outboard location L2.

In the currently described embodiment this attachment is by bolts that pass through suitable brackets (not shown), with the bolts being fastened by suitable nuts. However it will be appreciated that any suitable form of attachment may be used.

Each rib 15, 16, 17 is provided with a plurality of circular cut-outs 33 along its length, to reduce its weight.

The ribs 15, 16, 17 are configured to transmit aerodynamic loads between the rear and front spars 13, 14. Each rib 15, 16, 17 is arranged to increase the stiffness of the winglet 4 in the direction of the depth of the winglet 4 and to increase the stiffness of the winglet 4 in the chord wise direction (i.e. to prevent fore-aft deformation). Each rib 15, 16, 17 is also arranged to increase the stiffness of the winglet 4 in the direction of twisting of the winglet 4 about the span wise direction in which the winglet 4 extends. In this regard, each rib 15, 16, 17 is arranged to maintain the camber, i.e. the profile shape, of the winglet 4.

Figure 6:
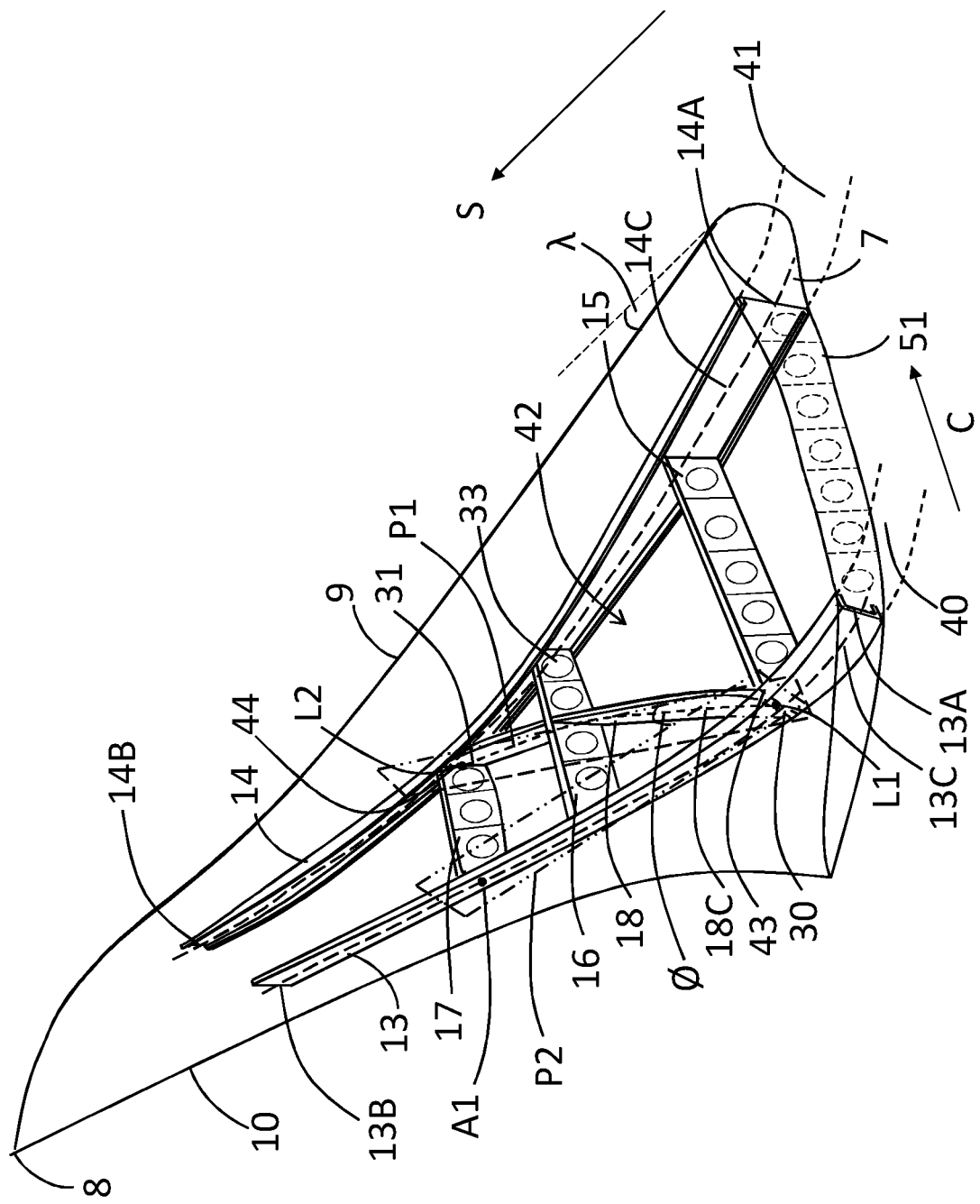
FIG. 6 is schematic perspective view (from above and looking outboard) of the wing tip device shown in FIGS. 3 to 5, where the upper skin of the wing tip device has been omitted for illustrative purposes and showing a pair of notional geometric planes (P1, P2) defined by a cross-brace spar and a rear spar of the wing tip device.
Figure 7:
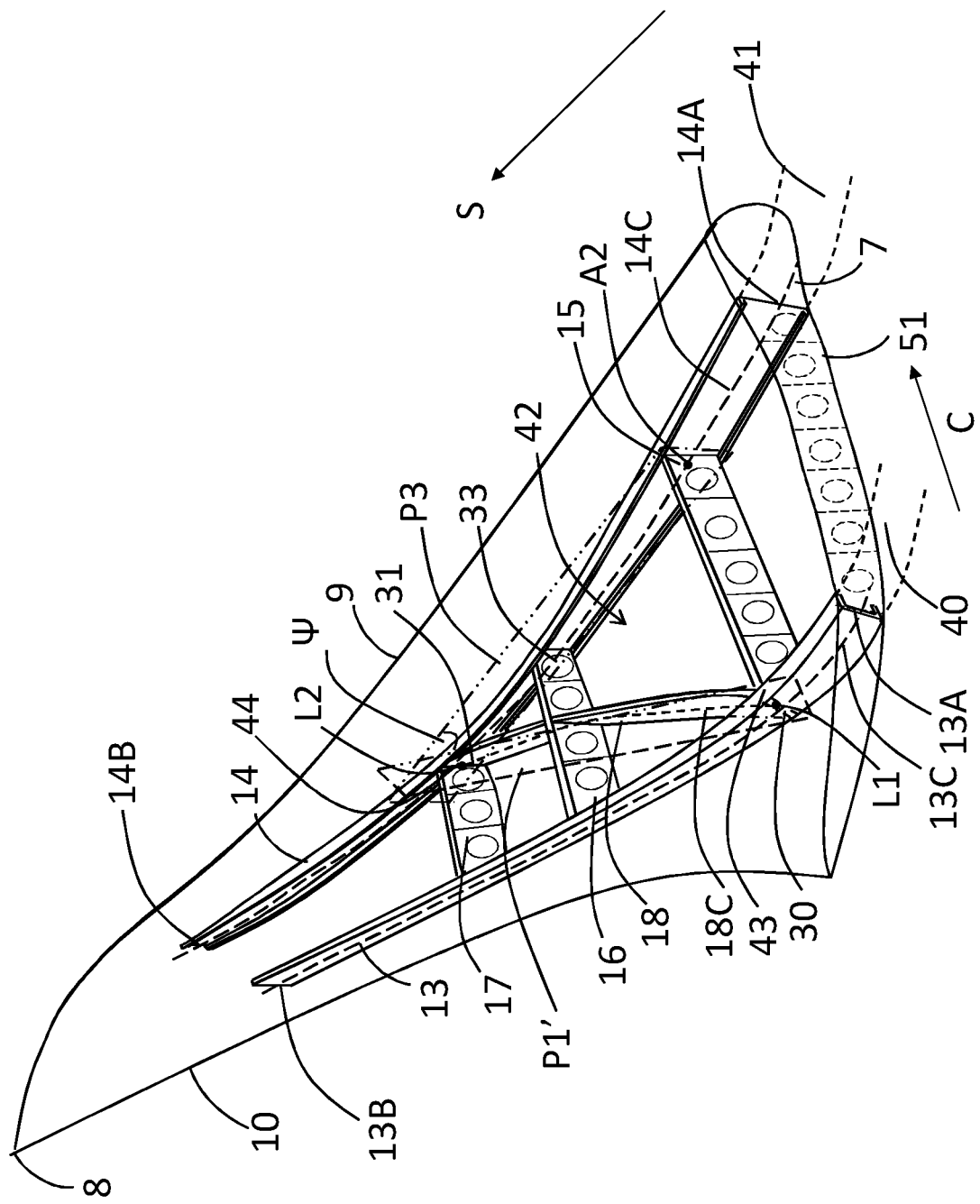
FIG. 7 is a view corresponding to that of FIG. 6, but showing a pair of notional geometric planes (P1', P3) defined by the cross-brace spar and a front spar of the wing tip device.

Referring to FIGS. 6 and 7, the winglet 4 further comprises a cross-brace spar 18. The cross-brace spar 18 is oriented such that it links an inboard location L1 on the rear spar 13 to an outboard location L2 on the front spar 14. The outboard location L2 is spaced forward of the inboard location L1 in the chord wise direction C of the winglet 4.

It will be appreciated that in relation to the inboard and outboard locations L1, L2, the terms 'inboard' and 'outboard' are relative to each other, i.e. the inboard location is inboard, in the span wise direction (S) of the winglet 4, of the outboard location (and vice versa).

It will be appreciated that a 'cross-brace' spar refers to any type of spar that extends in both the chord wise and span wise directions of the wing tip device 4 and links the rear and front spars 13, 14 such that it transmits aerodynamic loads (e.g. force and/or torque) between the rear and front spars 13, 14. The cross brace spar 18 is a structural brace support.

The cross-brace spar 18 is elongate and extends from a rear end 30, directly attached to the rear spar 13 at the inboard location L1, to a front end 31, directly attached to the front spar 14 at the outboard location L2.

In this respect, at each of the inboard and outboard locations L1, L2, the respective end of the cross-brace spar 18 is directly attached to the respective spar 13, 14 by bolts that pass through suitable brackets (not shown) on the cross-brace spar 18 and into the spar 13, 14, with the bolts being fastened by suitable nuts. However, it will be appreciated that any suitable type of attachment, may be used.

The cross-brace spar 18 extends from its rear end 30 to its front end 31 along a longitudinal direction 18C. The cross-brace spar 18 curves as it extends from its rear end 30 to its front end 31. In this respect, the cross-brace spar 18 curves when looking at the winglet 4 in plan form. Accordingly, the longitudinal direction 18C of the cross-brace spar 18 is curved. The cross-brace spar 18 also extends upwardly, as it extends from its rear end 30 to its front end 31 (i.e. its longitudinal direction 18C extends upwardly). In the currently described embodiment the cross-brace spar 18 is not twisted (about its longitudinal direction 18C).

The cross-brace spar 18 has a substantially rectangular cross-sectional shape (about the longitudinal direction 18C). The cross-brace spar 18 is substantially solid. However, it will be appreciated that the cross-brace spar may have any suitable cross-sectional shape (including an I-shaped, H-shaped or C-shaped cross-sectional shape, for example).

The cross-brace spar 18 is made of CFRP. However, it will be appreciated that any suitable material may be used, including a composite or metallic material, for example.

The cross-brace spar 18 is located internally of the upper and lower wing skins 11, 12 of the winglet 4. The cross-brace spar 18 is attached (e.g. by bonding or fasteners) to the upper and lower wing skins 11, 12 to increase the rigidity of the wing skins 11, 12.

The cross-brace spar 18 is oriented such that as it extends forwards in the chord wise direction (C), it extends outboard in the span wise direction (S). In this regard, as its longitudinal direction 18C extends from the rear end 30 to the front end 31 of the cross-brace spar 18, the longitudinal direction 18C extends forwards in the chord wise direction (C) and outboard in the span wise direction (S).

It will be appreciated that the 'forward' chord wise direction refers to the chord wise direction (C) in the direction from the rear spar 13 to the front spar 14.

The cross-brace spar 18 is configured to transmit aerodynamic loads between the rear and front spars 13, 14. The cross-brace spar 18 is configured to provide a primary load path between the rear and front spars 13, 14. The aerodynamic loads may be force and/or torque.

The cross-brace spar 18 is oriented such that it is oblique to the front and rear spars 14, 13. It will be appreciated that the term 'oblique' refers to any inclined orientation that is not perpendicular (and not parallel).

Figure 8B:
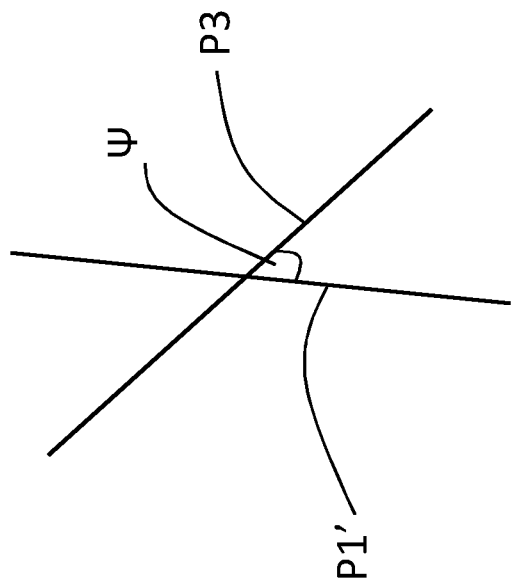
FIG. 8b is a view of the notional geometric planes (P1', P3) in FIG. 7 when viewed looking along the thickness direction (t) of the winglet 4 (from above) at the outboard location L2.
Figure 8A:
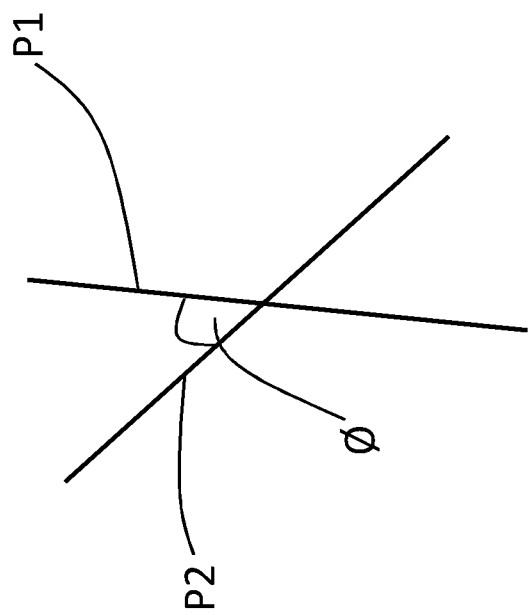
FIG. 8a is a view of the notional geometric planes (P1, P2) in FIG. 6 when viewed looking along the thickness direction (t) of the winglet 4 (from above) at an inboard location L1.

In this regard, the cross-brace spar 18 is oblique to the rear spar 13 in that that a plane (P1—see FIG. 6) that passes through the inboard and outboard locations L1, L2 and is parallel to the thickness direction (t) of the winglet 4 at the inboard location L1 is oriented at an oblique angle (Ø) to a plane (P2—see FIG. 6) that passes through the inboard location L1 and a location (A1) on the rear spar 13 that is at a corresponding span wise position to the outboard location L2 (on the front spar 14) and is parallel to the thickness direction (t) of the winglet 4 at the inboard location L1. FIG. 8a shows a view of these planes P1, P2 when viewed looking along the thickness direction (t) of the winglet 4 (from above) at the inboard location L1.

In the currently described embodiment the oblique angle (Ø) is approximately 40°. However, it will be appreciated that any oblique angle may be used.

The cross-brace spar 18 is oblique to the front spar 14 in that a plane (P1'—see FIG. 7) that passes through the inboard and outboard locations L1, L2 and is parallel to the thickness direction (t) of the winglet 4 at the outboard location L2 is oriented at an oblique angle (W) to a plane (P3—see FIG. 7) that passes through the outboard location L2 and a location (A2) on the front spar 14 that is at a corresponding span-wise position to the inboard location L1 (on the rear spar 13) and is parallel to the thickness direction (t) of the winglet 4 at the outboard location L2. FIG. 8b shows a view of these planes P1', P3 when viewed looking along the thickness direction (t) of the winglet 4 (from above) at the outboard location L2.

In the currently described embodiment the oblique angle (W) is approximately 40°. However, it will be appreciated that any oblique angle may be used.

In this regard, it will be appreciated that a straight line that passes through the inboard and outboard locations L1, L2 is oriented at an oblique angle (Ø) to a straight line that passes through the inboard location L1 and the location A1 on the rear spar 13 that is at a corresponding span wise position to the outboard location L2, when the winglet 4 is viewed looking along an axis that is parallel to the thickness direction (t) of the winglet 4 at the inboard location L1.

Similarly, a straight line that passes through the inboard and outboard locations L1, L2 is oriented at an oblique angle (W) to a straight line that passes through the outboard location L2 and a location A2 on the front spar 14 that is at a corresponding span-wise position to the inboard location L1, when the winglet 4 is viewed looking along an axis that is parallel to the thickness direction (t) of the winglet 4 at the outboard location L2.

At the inboard location L1 the local longitudinal direction 18C of the cross-brace spar 18 is oblique to the local longitudinal direction 13C of the rear spar 13 when the winglet 4 is viewed looking along an axis that is parallel to the thickness direction (t) of the winglet 4 at the inboard location L1.

Also, at the outboard location L2 the local longitudinal direction 18C of the cross-brace spar 18 is oblique to the local longitudinal direction 14C of the front spar 14 when the winglet 4 is viewed looking along an axis that is parallel to the thickness direction (t) of the winglet 4 at the outboard location L2.

It will be appreciated that a reference to a 'local' longitudinal direction refers to the direction of a tangent to the longitudinal direction at that location.

The oblique angles (θ and W) referred to above are the respective internal angles defined by the respective notional planes/lines, i.e. between adjacent and opposing faces (adjacent and opposing in the chord wise direction) of the respective planes (P1, P2) (P1', P3). These internal angles are acute angles, i.e. less than 90°.

The rear end of the inboard rib 15 is also attached (in addition to its attachment to the rear spar 13) to the rear end 30 of the cross-brace spar 18, at the inboard location L1. This attachment is by a corner bracket and bolts (not shown).

However, it will be appreciated that any suitable type of fastener, or any suitable type of attachment, may be used.

Similarly, the front end of the outboard rib 17 is also attached (in addition to its attachment to the front spar 14) to the front end 31 of the cross-brace spar 18, at the outboard location L2. This attachment is by a corner bracket and bolts (not shown). However, it will be appreciated that any suitable type of fastener, or any suitable type of attachment, may be used.

The cross-brace spar 18 passes through the intermediate rib 16 and is attached to the intermediate rib 16 part way along the length of the intermediate rib 16 (i.e. between the ends of the intermediate rib 16) This attachment is by bolts and a suitable bracket (not shown). However, it will be appreciated that any suitable type of attachment may be used.

The cross-brace spar 18 is a single continuous spar. In this respect, it is not formed of discrete sections that are connected together (e.g. discrete sections separated by the intermediate rib 16). In this respect, the cross-brace spar 18 passes uninterrupted through a slot in the intermediate rib 16.

The cross-brace spar 18 is oriented at an oblique angle to each rib 15, 16, 17.

The inboard rib 15, the outboard rib 17 and the portions of the rear and front spars 13, 14 that extend between the inboard and outboard ribs 15, 17 together form a winglet box 42 (i.e. a structural box) and the cross-brace spar 18 extends diagonally across the winglet box 42, from one corner of the winglet box 42, at the inboard location L1, to a diagonally opposite corner of the winglet box 42, at the outboard location L2.

The cross-brace spar 18 structurally links each of the ribs 15, 16, 17 and the rear and front spars 13, 14 together. The cross-brace spar 18 is configured to transmit aerodynamic loads between the rear and front spars 13, 14 and the ribs 15, 16, 17.

The cross-brace spar 18 is advantageous in that it may transmit aerodynamic loads between the rear and front spars 13, 14. This may, in particular, reduce the load on the rear spar 13. Furthermore, the cross-brace 18 spar may help to provide a more balanced load path into the wing 3 (i.e. into a wing box of the wing 3). The cross-brace spar 18 may allow the winglet 4 to more effectively resist external aerodynamic loads, for example during gust or manoeuvre.

The cross-brace spar 18 may allow for a reduction in the number of ribs that would otherwise be required in order to resist aerodynamic loads. In this respect, the cross-brace spar 18 may advantageously react the brazier load that would usually be carried by the ribs. Similarly, the cross-brace spar 18 may allow for the reduction in the number of other components that may otherwise be required in order to resist the aerodynamic loads, for example stringers and rib posts. The cross-brace spar 18 may allow for a reduction in the required thickness of the wing assembly, as well as a reduction in the number of bolts required to transfer load, at the connection of the winglet 4 to the wing 3.

The cross-brace spar 18 is particularly advantageous when the winglet 4 is highly swept because a highly swept winglet 4 produces a high external yaw component of loading during high manoeuvre and gust conditions. This high degree of loading would otherwise be taken by the rear spar 13. Therefore the cross-brace spar 18 decreases the loading on the rear spar 13.

In view of the above, the cross-brace spar 18 may facilitate a reduction in weight of the winglet 4 and therefore of the aircraft 1, thereby providing performance advantages.

Due to the reduction in parts required, the cross-brace spar 18 may also provide a reduction in manufacturing time and cost.

Figure 9:
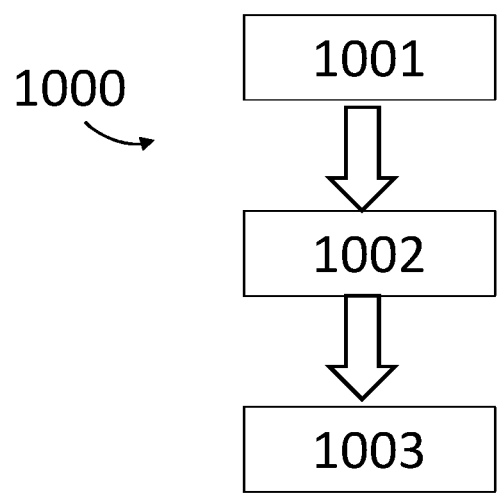
FIG. 9 is a flow-chart showing the steps of a method of manufacture of an aircraft, according to a further embodiment of the invention.

Referring to FIG. 9, there is shown a flowchart illustrating a method 1000 of manufacture of an aircraft 1 (i.e. the aircraft 1 of the above described embodiment), comprising a wing 3 and a winglet 4 at the tip of the wing 3, according to a further embodiment of the invention.

The method comprises the step (1001) of manufacturing a winglet 4, which comprises linking an inboard location L1 on a rear spar 13 of the winglet 4 to an outboard location L2 on a front spar 14 of the winglet 4 with a cross-brace spar 18 that is oblique to the front and rear spars 14, 13.

The winglet 4 is then attached to a tip of an aircraft wing 3, to form a wing assembly 2 (step 1002). The wing assembly 2 is then attached to an aircraft fuselage 50 to form an aircraft 1 (step 1003) (it will be appreciated that a pair of wing assemblies 2 are attached to the fuselage to form a complete aircraft 1).

The rear and front spars 13, 14 of the winglet 4 may be linked by the cross-brace spar 18 before or after the winglet 4 is attached to the tip of the wing 3. However, preferably the rear and front spars 13, 14 of the winglet 4 are linked by the cross-brace spar 18 before the winglet 4 is attached to the tip of the wing 3.

The rear and front spars 13, 14 of the winglet 4 may be linked by the cross-brace spar 18 before or after the wing 3, or the wing assembly 2, is attached to the fuselage 50 of the aircraft. However, preferably the rear and front spars 13, 14 of the winglet 4 are linked by the cross-brace spar 18 before the wing 3, or the wing assembly 2, is attached to the fuselage of the aircraft 1.

The method (1000) may comprise linking the front and rear spars 14, 13 with the inboard and outboard ribs 15, 17 such that the inboard and outboard ribs 15, 17 and the front and rear spars 14, 13 together form the structural box 42. The cross-brace spar 18 may form a structural brace support that extends diagonally across the structural box 42.

Unless otherwise stated, references to the wing 3 and winglet 4 are in relation to their in-flight shape.

Unless otherwise stated, where 'or' has been referred to this means 'and/or'.

Whilst the present invention has been described and illustrated with reference to particular embodiments, it will be appreciated by those of ordinary skill in the art that the invention lends itself to many different variations not specifically illustrated herein.

For example, in a reverse orientation, the cross-brace spar 18 may be oriented such that it links an outboard location on the rear spar 13 to an inboard location on the front spar 14 (with the method of manufacture altered accordingly, i.e. to link an outboard location on the rear spar 13 to an inboard location on the front spar 14). However, it is preferred that the cross-brace spar 18 is oriented such that is links an inboard location L1 on the rear spar 13 to an outboard location L2 on the front spar 14 (as in the described embodiment) as this reduces the load on the rear spar 13.

The cross-brace spar 18 may not be directly attached to the front and rear spars 13, 14, for example it may instead be directly attached to the ribs 15, 16, 17 such that it links the front and rear spars 13, 14. However, it is preferred that the cross-brace spar 18 is directly attached to the front and rear spars 13, 14, as this provides a more continuous load path.

In the described embodiment, the inboard and outboard ribs 15, 17 are directly attached to the cross-brace spar 18 (at said ends of the ribs 15, 17). Alternatively, the inboard and outboard ribs 15, 17 may not be directly attached to the cross-brace spar 18, but may be linked to the cross-brace spar 18 by being directly attached to the front and rear spars 13, 14 (at different positions along the spars 13, 14 to the cross-brace spar 18).

The shape of the cross-brace spar 18 may vary. In the currently described embodiment the cross-brace spar 18 curves as it extends from its rear end 30 to its front end 31. Accordingly, its longitudinal direction 18C is curved. Alternatively, the cross-brace spar may be substantially straight. In this regard, the cross-brace spar may have a longitudinal axis that is substantially straight. In the currently described embodiment the cross-brace spar 18 extends upwardly, as it extends from its rear end 30 to its front end 31. Alternatively it may be substantially horizontal, or it may curve upwardly as it extends in the outboard direction, for example. The cross-brace spar may twist (about its longitudinal direction 18C) or it may not twist.

In the described embodiment the cross-brace spar 18 is continuous. Alternatively, it may comprise a plurality of sections, for example a plurality of length wise sections. In this respect, where the wing tip device comprises a plurality of ribs, the cross-brace spar may be divided into a plurality of length wise sections by the ribs.

The winglet 4 may comprise a different number and/or arrangement of ribs. In this respect, the winglet 4 may comprise no ribs (with the cross-brace spar providing all of the necessary structural link between the front and rear spars 14, 13).

In the currently described embodiment the wing tip device is a winglet 4. Alternatively, or additionally, the wing tip device may comprise a wing tip fence, a raked wing tip or a wing tip extension, for example.

The angle of sweep of the winglet 4 may be varied. In this respect, the winglet 4 preferably has a sweep angle (X) in the range 30° to 60°. As stated above, the cross-brace spar 18 is particularly advantageous when the winglet 4 is highly swept back. Alternatively, the winglet 4 may not be swept.

The twist of the winglet 4 may be varied. For example, the winglet twist may be washed in.

The aircraft 1 may be any air vehicle such as a manned aircraft or a UAV, for example.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a wing,
   a wing tip device at a tip of the wing extending upwardly from the tip of the wing as the wing tip device extends outboard of the wing in a spanwise direction of the wing, wherein the wing tip device includes a front spar, a rear spar, and a cross-brace spar linking the front spar to the rear spar,
   a first rib and a second rib each extending in a chordwise direction of the wing tip device between the front spar and the rear spar, wherein the first rib is adjacent a joint between the wing tip device and the wing and the second rib is outboard of the first rib along the spanwise direction,
   wherein an inboard end of the cross-brace spar is adjacent the second rib,
   wherein the cross-brace spar is oriented oblique to the front and rear spars, and
   wherein the cross-brace spar extends upwardly from an inboard location proximate one of the rear spar and the front spar to an outboard location proximate another of the front spar and the rear spar.

2. The aircraft according to claim 1, further comprising a third rib extending in the chordwise direction from the front spar to the rear spar and being a nearest rib to a tip of the wing tip device,
   wherein an outboard end of the cross-brace spar is adjacent the third rib, and
   wherein the second rib, the third rib, the front spar and the rear spar form a structural box and the cross-brace spar extends diagonally across the structural box.

3. The aircraft according to claim 1, wherein the wing tip device further comprises:
   a third rib extending in the chordwise direction from the front to the rear spar, and the third rib is a nearest rib to a tip of the wing tip device, and
   a fourth rib extending in the chordwise direction from the front spar to the rear spar, and the fourth rib is between the second rib and the third rib along the spanwise direction,
   wherein the fourth rib has an upper edge adjacent a first skin of the wing tip device along an entire length of the fourth rib and has a lower edge adjacent a second skin of the wing tip device along the entire length of the intermediate rib, wherein the cross-brace spar is linked to a middle region of the fourth rib.

4. The aircraft according to claim 1, wherein the wing tip device is swept back.

5. The aircraft according to claim 1, wherein the wing tip device is twisted about a span wise axis of the wing tip device.

6. The aircraft according to claim 1, wherein the wing tip device comprises a winglet.

7. The aircraft of claim 1, wherein the wing includes a front wing spar and a rear wing spar, and the front spar of the wing tip device is fixed to an end region of the front wing spar and the rear spar of the wing tip device is fixed to an end region of the rear wing spar.

8. A wing assembly comprising:
a wing including a tip, and
a wing tip device at the tip of the wing, wherein the wing tip device extends upwardly from the tip of the wing as the wing tip device extends outbound of the wing in a spanwise direction of the wing, and the wing tip device includes a front spar, a rear spar, and a cross-brace spar linking the front and rear spars, wherein the cross-brace spar is oriented oblique to the front and rear spars, and extends upwardly from an inboard location proximate one of the rear spar and the front spar to an outboard location proximate another of the front spar and the rear spar, and
a first rib and a second rib each extending in a chordwise direction of the wing tip device between the front spar and the rear spar, wherein the first rib is adjacent a joint between the wing tip device and the tip of the wing and the second rib is outboard of the first rib along the spanwise direction,
wherein an inboard end of the cross-brace spar is adjacent the second rib.

9. The wing assembly according to claim 8 wherein the cross-brace spar links an inboard location on the rear spar to an outboard location on the front spar.

10. The wing assembly of claim 8, wherein the wing includes a front wing spar and a rear wing spar, and the front spar of the wing tip device is fixed to an end region of the front wing spar and the rear spar of the wing tip device is fixed to an end region of the rear wing spar.

11. The wing assembly of claim 8, further comprising a third rib which is a rib nearest a tip of the wing tip device,
wherein an outboard end of the cross-brace spar is at the third rib, and
wherein a structural box is formed in the wing tip device by the front spar, the rear spar, the cross-brace spar, the second rib and the third rib.

12. A wing tip device including:
a front spar,
a rear spar,
a cross-brace spar linking the front and rear spars and is oriented oblique to the front and rear spars,
a first rib and a second rib each extending in a chordwise direction of the wing tip device between the front spar and the rear spar, wherein the first rib is configured to be adjacent a joint between a wing attached to the wing tip device tip device, and the second rib is outboard of the first rib along the spanwise direction,
wherein an inboard end of the cross-brace spar is adjacent the second rib,
wherein the wing tip device extends upwardly from a tip of the wing as the wing tip device extends outbound of the wing in a spanwise direction of the wing, and
wherein the cross-brace spar extends upwardly from an inboard location proximate one of the rear spar and the front spar to an outboard location proximate another of the front spar and the rear spar.

13. The wing tip device according to claim 12 wherein the cross-brace spar links an inboard location on the rear spar to an outboard location on the front spar.

14. The wing tip device of claim 12, wherein the wing includes a front wing spar and a rear wing spar, and the front spar of the wing tip device is fixed to an end region of the front wing spar and the rear spar of the wing tip device is fixed to an end region of the rear wing spar.

15. The wing tip device of claim 12, further comprising a third rib which is a rib nearest a tip of the wing tip device,
wherein an outboard end of the cross-brace spar is at the third rib, and
wherein a structural box is formed in the wing tip device by the front spar, the rear spar, the cross-brace spar, the second rib and the third rib.

16. A method of manufacture of a wing tip device for use with a wing of an aircraft, wherein the wing tip device includes a front spar, a rear spar, a first rib and a second rib each extending between the front and rear spars, wherein the first rib is adjacent an inboard edge of the wing tip device and the second rib is outboard of the first rib, the method comprising:
linking the front spar and the rear spar of the wing tip device directly to a cross-brace spar, orienting the cross-brace spar oblique to the front and rear spars, and linking an inboard end of the cross-brace spar directly to the second rib,
wherein the cross-brace spar extends upwardly from an inboard location proximate one of the rear spar and the front spar to an outboard location proximate another of the front spar and the rear spar, and
wherein the wing tip device is configured to attached to a tip of the wing, and extends upwardly from a tip of the wing as the wing tip device extends outbound of the wing.

17. The method of claim 16, further comprising:
configuring the front spar of the wing tip device to be fixed to an end region of a front wing spar of the wing, and
configuring the rear spar of the wing tip device to be fixed to an end region of a rear wing spar of the wing.

18. The method of manufacture according to claim 16 wherein the cross-brace spar links an inboard location on the rear spar to an outboard location on the front spar.

19. A method of manufacture of a wing assembly comprising:
manufacturing a wing tip device according to the method of claim 18, and
attaching the wing tip device to a tip of the wing for an aircraft.

20. The method of manufacture of claim 19 and further comprising attaching the wing assembly to a fuselage of an aircraft.

21. An aircraft comprising:
a wing having a tip, and
a wing tip device at the tip of the wing and extends upwardly from the tip of the wing as the wing tip device extends outbound of the wing in a spanwise direction of the wing, and the wing tip device includes a front spar, a rear spar, an inboard rib, a intermediate rib and an outboard rib,
wherein the inboard rib, the intermediate rib and the outboard rib each link the front and rear spars,
wherein at least the intermediate rib has an upper edge adjacent a first skin of the wing tip device along an entire length of the intermediate rib and has a lower edge adjacent a second skin of the wing tip device along the entire length of the intermediate rib,
wherein the inboard rib, the intermediate rib, the outboard rib, the front spar and the rear spar together form a structural box, and
wherein the wing tip device further comprises a structural brace support linking an inboard location on the rear spar to an outboard location on the front spar and the structural brace extends diagonally across the structural box and extends through the intermediate rib.

22. The wing tip device of claim 21, wherein the wing includes a front wing spar and a rear wing spar, and the front spar of the wing tip device is fixed to an end region of the front wing spar and the rear spar of the wing tip device is fixed to an end region of the rear wing spar.

23. An aircraft comprising:
a wing, and
a wing tip device at a tip of the wing extending upwardly from the tip of the wing as the wing tip device extends outboard of the wing in a spanwise direction of the wing,
wherein the wing tip device includes:
a front spar,
a rear spar,
a first rib extending in a chordwise direction of the wing tip device between the front spar and the rear spar, wherein the first rib is adjacent the wing;
a second rib extending in the chordwise direction and directly connected to the front spar and the rear spar, wherein the second rib is outboard of the first rib; and
a cross-brace spar oblique to the chordwise direction, extending upwardly, directly connected front spar and the rear spar, and having an inboard end at the second rib.

24. The aircraft according to claim 23, wherein the cross-brace spar is directly connected to a third rib at a region of the third rib midway between the front and rear spars.

* * * * *